Feb. 21, 1956 — D. M. KNOX — 2,735,205
INVERTIBLE AND ADJUSTABLE PICTURE FRAMES
Filed Aug. 6, 1953 — 2 Sheets-Sheet 1
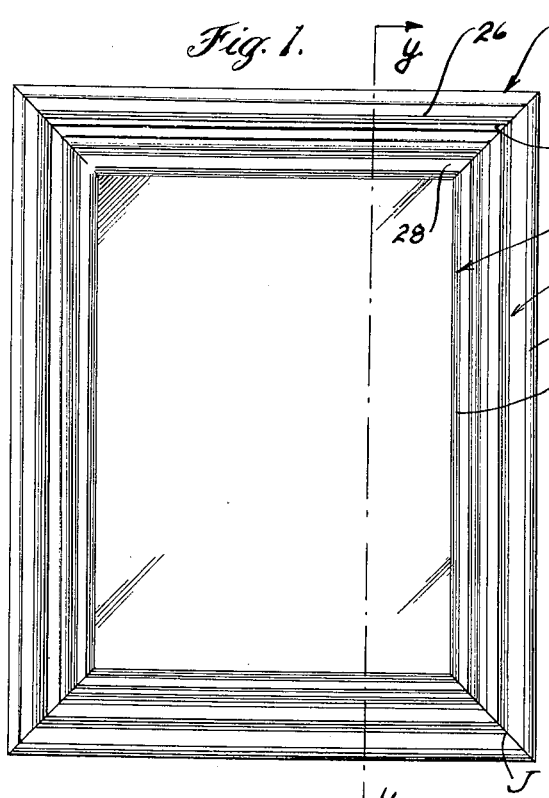
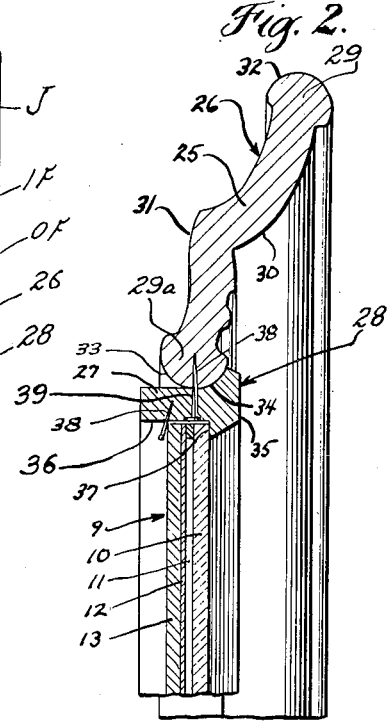
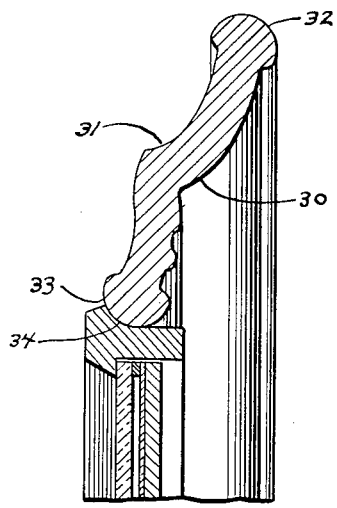
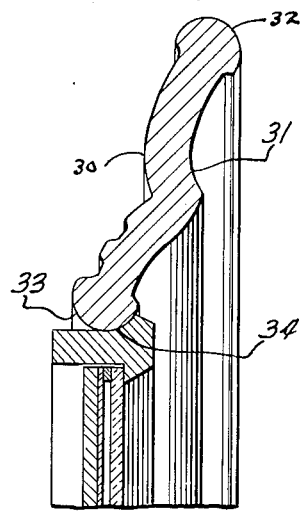
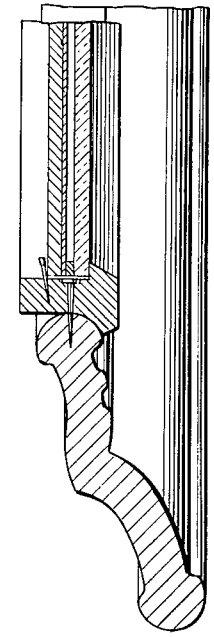
INVENTOR
David M. Knox
BY
Synnestvedt & Lechner
ATTORNEYS

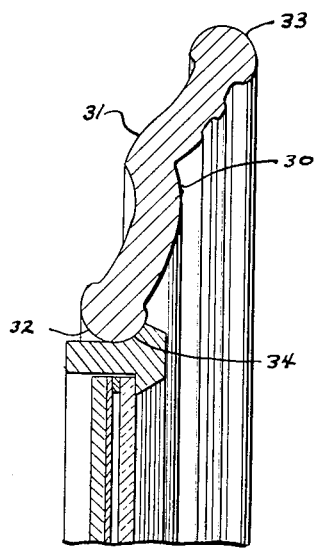
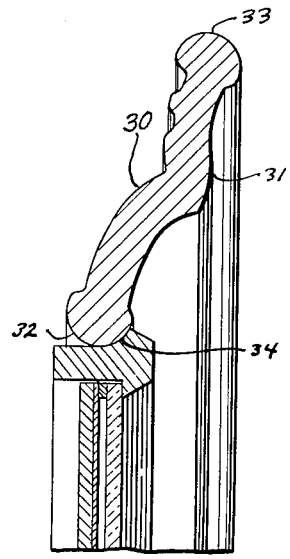
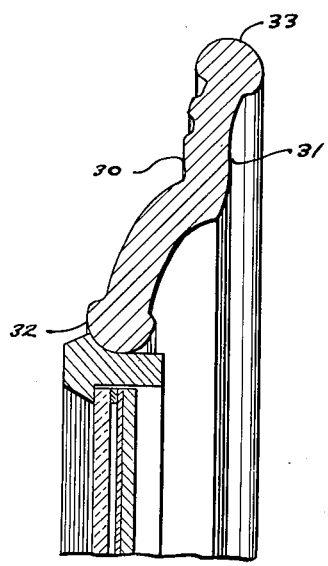
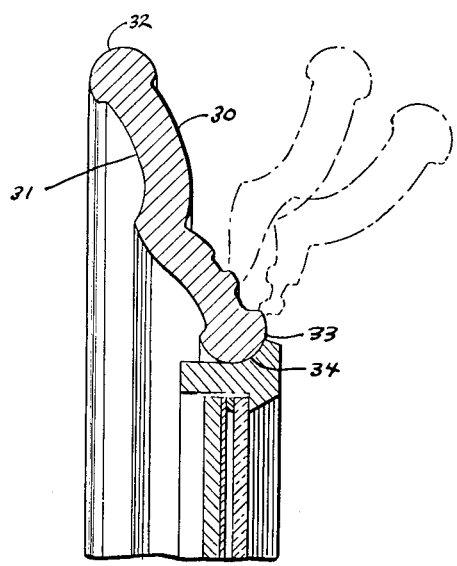
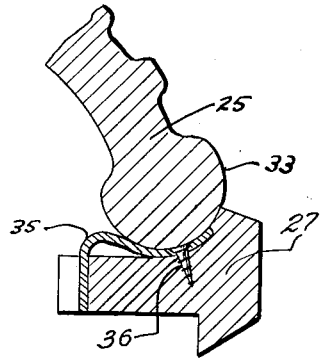
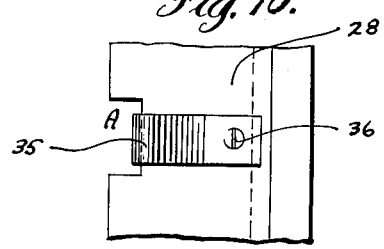

United States Patent Office 2,735,205
Patented Feb. 21, 1956

2,735,205

INVERTIBLE AND ADJUSTABLE PICTURE FRAMES

David M. Knox, New York, N. Y.

Application August 6, 1953, Serial No. 372,753

5 Claims. (Cl. 40—155)

This invention relates to holders for the carrying of pictures or the like and contemplates a holder adaptable in a wide variety of styles. This application is a division of my copending application Serial No. 217,954, filed March 28, 1951, now Patent 2,657,488, issued November 3, 1953.

The holders of the present invention are characterized by having inner and outer frames of novel but differing cross sectional design, the inner and outer frames being detachable from one another and adapted to cooperate in a special manner. The inner frame is adapted to carry a picture or the like.

The invention contemplates a holder constructed with frames of such novel cross sectional design that from a single outer frame and a single inner frame the holder is adaptable in a wide variety of styles or face-effects; for example, the plane of the picture may be projected or retracted from a plane through the frame at its outer edges and in either of these positions the face of the frame may be changed in several ways.

The frames of the present invention have particular advantages and desirable qualities from the standpoint of the frame manufacturer. Without an extensive stock of frame components a wide diversity of frame sizes, styles, colors, finishes and planar disposition of the picture with respect to the frame is possible. According to the invention, a single frame is adaptable to secure varied artistic results without the necessity of extensive hand and machine work.

In addition, the frames of the present invention have a decided advantage for the user. Not only may the physical arrangement of the frames be changed but may be conveniently changed in coloring or tinting. Thus, the frame may be brought into harmony with the asthetic features of the picture itself and may easily be adapted to fit the decorative scheme of the surroundings.

The principal object of the invention is to provide a holder having an outer frame whose opposite sides are artistically configured and having a picture-carrying inner frame also artistically configured, together with means to detachably hold the frames together so that the inner frame can be placed alternatively on opposite sides of the outer frame to provide a variety of styles for the picture.

How the frames of the present invention are constructed and how the advantages are achieved will be brought out more fully in the following description of the invention. Referring to the accompanying drawings:

Figure 1 is a full face view of a picture frame constructed in accordance with my invention, this view being to a smaller scale than the others;

Figure 2 is a view taken on the section line Y—Y of Figure 1 and illustrates the cross-section of the inner and outer molding members making up the inner and outer frames of my invention, together with the cross-section of the picture ensemble. As illustrated, the plane of the picture is retracted from a plane through the frame at its outer edge;

Figure 3 is a view similar to that shown in Figure 2 except that the outer molding members making up the outer frame are turned edge for edge with respect to the moldings making up the inner frame, illustrating the fact that although the same face surface is on the viewing side a different face-effect is provided. The angle of cut of the outer molding for the miter joint must here be 90° from that selected for the assembly shown in Figure 2;

Figure 4 is a view similar to Figure 2 except that the outer molding members making up the outer frame are inverted face for face, thus illustrating a different face surface on the viewing side;

Figure 5 is a view similar to that shown in Figure 2 except that the molding members making up the outer frame are turned edge for edge and inverted face for face with respect to the moldings making up the inner frame and illustrating a different face surface on the viewing side. Again, the angle of the cut for the miter joint must be 90° from that selected for the assembly shown in Figure 2;

Figure 6 is a view similar to that shown in Figure 4 except that the moldings making up the inner frame have been inverted face for face with respect to the moldings making up the outer frame so that the plane of the picture is projected from a plane through the frame at its outer edges, thus showing a different face surface on the viewing side;

Figure 7 is a view similar to that in Figure 6 except that the outer molding members making up the outer frame are inverted face for face and turned edge for edge with respect to the moldings making up the inner frame, thus showing a different face surface on the viewing side. The angle of the cut for the miter joint must be 90° from that selected for the assembly shown in Figure 6;

Figure 8 illustrates one embodiment of a novel joint arrangement employed in my invention;

Figures 9 and 10 illustrate, to a larger scale, a spring latch by means of which the inner and outer frames may be detachably locked in position.

The outer molding members 26—26 and the inner molding members 28—28 respectively make up the outer frame OF and in the inner frame IF and abut at the mitered joints J where they may be secured together as by brads (not shown). Figure 1 is a full face view of a frame 23 constructed in accordance with the present invention. Figure 2 is a view taken through a section Y—Y of Figure 1 and illustrates the cross-sectional area 25 of one of the outer molding members 26 making up the outer frame OF and the cross-sectional area 27 of one of the inner molding members 28 making up the inner frame IF. Also illustrated in Figure 2 is the cross-section of the picture ensemble 9 comprising glass 10, mat 11, picture 12 and backing 13.

The cross-sectional area 25 of the outer molding member 26 is, in this embodiment, defined by the outer convex boundaries 32 and 33 of the two opposite edge portions 29 and 29a and by the two opposite, interconnecting, dissimilar face surfaces 30 and 31. The cross-sectional area 25 is generally elongated along an axis through the opposite edge portions 29 and 29a and is asymmetric about a plane transverse the axis of elongation.

The cross-sectional area 27 of the inner molding member 28 is partly defined by a line representing surface 34 which is generally concave in shape corresponding to the convex surfaces 32 and 33 of the outer molding member. It is also partly defined by lines representing surfaces 35 and 36. Surface 35 corresponds to the front side of the frame, that is to say, the side from which the picture is viewed. Surfaces 36 and 37 are adapted to serve as means for holding the picture ensemble in the frame. The picture ensemble is secured in the frame by means of brad 38.

As illustrated in Figure 2 the engagement of the outer and inner molding members is made by the abutment of convex surface 33 and concave surface 34. As will be brought out more fully hereinafter, convex surface 32 is also (alternatively) adapted to abut the inner molding member. In this embodiment the inner and outer molding members are secured together as by brad 39.

As has been pointed out heretofore, one of the important features of the present invention is the provision for projection and retraction of the plane of the picture with respect to a plane through the frame at its outer edges and for change in face-effects in projection and retraction. These features are made possible by the novel design of the cross-sectional area of the outer molding, the variable interrelation of the cut for the miter joint with respect to the outer molding and the variable interengagement between the inner and outer molding. This embodiment of the invention (which is the preferred embodiment) permits not only projection or retraction but also provides for a wide selection of the depth or extent of the projection or retraction. In addition the design permits, for any one selected depth or extent of projection or retraction at least four different changes in the face surface presented to the viewing side. How these features are brought about is described more fully below.

How the four different changes in face-effect are accomplished in retraction is illustrated in Figures 2, 3, 4 and 5. This is described in the three paragraphs following.

In Figure 2 face surface 30 is presented to the viewing side of the frame. In Figure 3 surface 30 is also presented to the front of the frame; however, the contours are changed in position relative to the inner molding member, hence, a change in face-effect. To secure this change, the outer molding members are turned edge for edge with respect to the inner molding so that convex surface 32 (instead of the surface 33) abuts concave surface 34. This is accomplished by making the cut for the miter joint at 90° relative to the direction of cut selected for the assembly illustrated in Figure 2.

Comparing Figures 2 and 4, it is seen in Figure 4 that face surface 31 is presented to the front instead of face surface 30. This is accomplished by merely inverting the outer molding members face for face with respect to the inner molding. Note in both instances convex surface 33 engages concave surface 34.

A comparison of Figure 2 and Figure 5 shows that in Figure 5 surface 31 is exposed to the picture front. The difference in face-effect between Figures 2 and 5 is accomplished by making the cut for the miter joint for the assembly shown in Figure 5 90° from that selected for the assembly as shown in Figure 2, and selecting surface 31 as the front surface with concave surface 32 engaging surface 34. It might be pointed out that in Figure 4 surface 31 is also exposed to the picture front, but the face-effects are different because the relative positions of the contours have been changed.

When the picture is retracted it may be projected by merely inverting the outer frame with respect to the inner frame or vice versa. (The assembled frame as a whole is inverted not merely the molding members individually.) This may be done with each of the four assemblies illustrated in Figures 2, 3, 4 and 5. For example, an inspection of Figures 2 and 6 shows that the outer molding has been inverted, thus projecting the plane of the picture with respect to a plane through the frame at its outer edges. In Figure 6 surface 31 is exposed to the viewing side and convex surface 33 engages convex surface 34.

When the plane of the picture is projected from the frame, four different face-effects may also be selected. This is accomplished as explained above, i. e., by inverting the molding members face for face or turning edge for edge with respect to the inner molding with appropriate selection of the direction of cut for the miter joint. By way of example a comparison of Figures 6 and 7 shows that the molding member has been inverted face for face and turned edge for edge with respect to the inner molding. The direction for the cut of the miter joint for the assembly illustrated in Figure 7 is 90° from that of Figure 6.

Another important feature of the present embodiment of my invention is the provision for selection of the depth or extent of the projection or retraction of the picture with respect to the frame. How this is accomplished will be readily apparent from inspection of Figure 8 where it is clear that in disassembled condition the novel engagement of surfaces 33 and 34 provides for the outer molding member to be moved or adjusted relative to the inner molding. Thus, in constructing a picture frame the depth or extent of the projection or retraction is determined, the cut for miter joint is made accordingly and the components of the frame secured together. This feature is particularly advantageous because it permits of nice discrimination with respect to the angle between the frame and the picture. Also it will be readily apparent that between the angular limits of the ball or variable angle joint the selection of differing face-effects is, within practical reason, limitless.

From the above description, together with the figures shown in the drawings, it is readily apparent that either in projection or retraction of the picture with respect to the frame, four different face-effects may be selected from one molding section together with wide diversity in the extent of the projection or retraction.

Another feature of the preferred embodiment of the invention is a novel arrangement for locking the inner and outer frames in position. This is clearly illustrated in Figures 9 and 10. The lock 35 is comprised essentially of a small piece of resilient material such as steel or brass which is rectangular in shape and at least one portion of which is formed generally with the contour of surface 34. A plurality of these springs are attached to the inner molding member, say, for example, one on each side of the four sides. The spring is attached to the concave surface of the inner molding member by means of small screw 36. In assembling the inner and outer moldings, the inner molding is pushed through the opening of the outer molding and the spring is forced back through the recess A and snaps to locking position after the ball end of the outer molding passes the locking bulge of the spring.

I claim:

1. A holder for pictures or the like comprising: an outer frame having opposing face surfaces each including ornamentation adapted alternatively for optical cooperation with a picture or the like, said outer frame having an inner edge constructed to form an aperture and including convex surfacing and said outer frame being arranged whereby an inner frame may be inserted and withdrawn in and from said aperture alternatively on opposite sides of the outer frame; an inner frame having means for carrying a picture or the like and adapted for insertion and withdrawal in and from said aperture alternatively on said opposite sides, the inner frame having an outer edge which includes concave surfacing adapted to interengage said convex surfacing when the inner frame is inserted into the aperture; and resilient means secured to the outer edge of said inner frame and adapted to permit said insertion and withdrawal of the inner frame and operable when the inner frame is inserted in the aperture to press the interengaging convex and concave surfaces together whereby to hold the frames together.

2. A construction in accordance with claim 1 wherein said resilient means comprises a strip of spring-like metal.

3. A construction in accordance with claim 1 wherein said resilient means comprises a strip of spring-like metal formed with a contour generally corresponding to said concave surfacing, one end being fast upon said outer edge and the other end being free.

4. A holder for pictures or the like comprising: an outer frame having opposing face surfaces each including ornamentation adapted alternatively for optical cooperation with a picture or the like, said outer frame having an inner edge constructed to form an aperture and said outer frame being arranged whereby an inner frame may be inserted and withdrawn in and from said aperture alternatively on opposite sides of the outer frame; an inner frame having means for carrying a picture or the like and further having an outer edge comprising a portion constructed whereby the inner frame may be inserted and withdrawn in and from said aperture alternatively on said opposite sides and another portion whose periphery is greater than said aperture, said last portion having surfacing adapted to interengage the inner edge of said outer frame whereby to prevent the inner frame from completely sliding through said aperture; and resilient means secured to the outer edge of said inner frame and adapted to permit said insertion and withdrawal of the inner frame and operable when the inner frame is inserted in the aperture to press said surfacing and said inner edge together whereby to hold the frames together.

5. A holder for pictures or the like comprising: an outer frame having opposing face surfaces each including ornamentation adapted alternatively for optical cooperation with a picture or the like, said outer frame having an inner edge constructed to form an aperture and said outer frame being arranged whereby an inner frame may be inserted and withdrawn in and from said aperture alternatively on opposite sides of the outer frame; an inner frame having means for carrying a picture or the like and having an outer edge arranged to permit said insertion and withdrawal on said opposite sides whereby a picture optically cooperates with one or the other of said face surfaces; and resilient means operating between the inner edge of said outer frame and the outer edge of said inner frame and adapted to permit said insertion and withdrawal and further being adapted to hold the frames together when the inner frame is inserted in the aperture.

References Cited in the file of this patent

UNITED STATES PATENTS

| 312,005 | Naughton | Feb. 10, 1885 |
| 481,117 | Naegele | Aug. 16, 1892 |
| 945,576 | McPherson | Jan. 4, 1910 |
| 1,692,999 | Siegel | Nov. 27, 1928 |

FOREIGN PATENTS

| 120,813 | Australia | Jan. 10, 1931 |